United States Patent
Wang et al.

(10) Patent No.: US 11,093,464 B1
(45) Date of Patent: Aug. 17, 2021

(54) GLOBAL DEDUPLICATION ON DISTRIBUTED STORAGE USING SEGMENT USAGE TABLES

(71) Applicant: VMware, Inc., Palo Alto, CA (US)

(72) Inventors: Wenguang Wang, Santa Clara, CA (US); Vamsi Gunturu, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 1 day.

(21) Appl. No.: 16/857,574

(22) Filed: Apr. 24, 2020

(51) Int. Cl.
*G06F 16/00* (2019.01)
*G06F 16/215* (2019.01)
*G06F 16/22* (2019.01)

(52) U.S. Cl.
CPC ........ *G06F 16/215* (2019.01); *G06F 16/2255* (2019.01)

(58) Field of Classification Search
CPC .................... G06F 16/215; G06F 16/2255
See application file for complete search history.

(56) References Cited

U.S. PATENT DOCUMENTS

| | | | | |
|---|---|---|---|---|
| 10,761,758 B2 * | 9/2020 | Doerner | ............. | G06F 12/0261 |
| 2008/0201391 A1 * | 8/2008 | Arakawa | ............. | G06F 11/1471 |
| 2012/0158670 A1 * | 6/2012 | Sharma | ................. | G06F 16/174 |
| | | | | 707/692 |
| 2013/0262805 A1 * | 10/2013 | Zheng | .................. | G06F 3/0683 |
| | | | | 711/162 |
| 2018/0060367 A1 * | 3/2018 | Ioannou | ............. | G06F 16/2272 |
| 2018/0364949 A1 * | 12/2018 | Aston | ..................... | G06F 3/061 |
| 2020/0301593 A1 * | 9/2020 | Vaithianathan | ....... | G06F 3/0641 |
| 2021/0034247 A1 * | 2/2021 | Kucherov | ............ | G06F 3/0608 |

* cited by examiner

*Primary Examiner* — Diedra McQuitery

(57) ABSTRACT

Solutions are disclosed for blocks in a multi-writer log-structured file system. Solutions include selecting candidate segments in a storage medium; reading blocks of the candidate segments; determining whether any blocks are duplicates; updating a reference count for the duplicate blocks; identifying unique blocks; writing at least a portion of the unique blocks to a log; determining whether the log has accumulated a full segment of data; based at least on determining that the log has accumulated a full segment of data, writing the full segment to the storage medium; updating a segment usage table (SUT) to mark the candidate segments as free; and updating the SUT to mark a segment of the storage medium as no longer free. Some examples identify a window start time and stop time, because older segments have been deduped and younger segments may be volatile. Some examples adjust the window to improve performance.

20 Claims, 9 Drawing Sheets

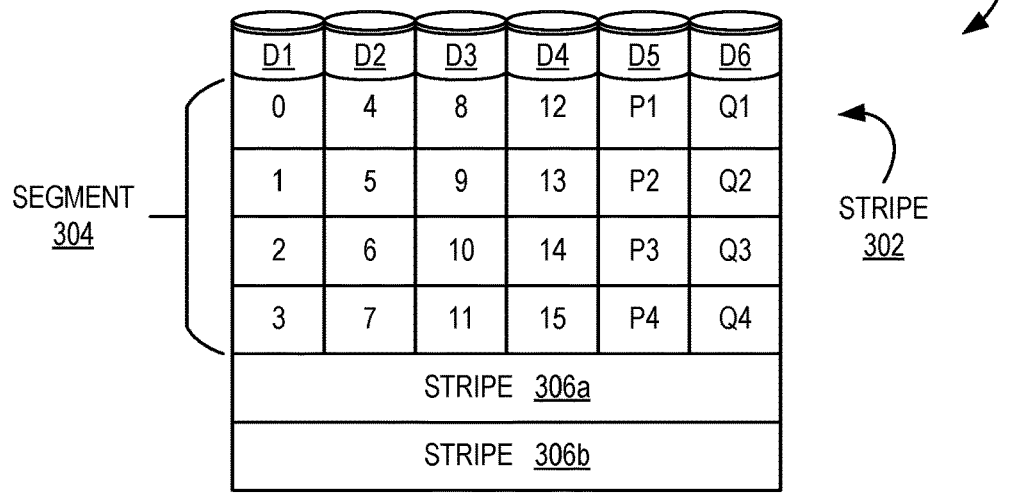

GLOBAL DEDUPLICATION ON DISTRIBUTED STORAGE USING SEGMENT USAGE TABLES

BACKGROUND

In some distributed arrangements, servers are distinguished as compute nodes and storage nodes. Although a storage node may attach a large number of storage devices (e.g., flash, solid state drives (SSDs), non-volatile memory express (NVMe), Persistent Memory (PMEM)) processing power may be limited beyond the ability to handle input/output (I/O) traffic. This may preclude the ability to execute some virtualization logic directly on a storage node, for example with arrangements using a global log-structured file system (LFS). Additionally, a global LFS may present challenges for deduplication, when writers operate in parallel, independently of each other.

During data writes to storage devices, a phenomenon termed write amplification may occur, in which more data is actually written to the physical media than was sent for writing in the I/O. Write amplification is an inefficiency that produces unfavorable I/O delays, and may arise as a result of parity blocks that are used for error detection and correction (among other reasons). In general, the inefficiency may depend somewhat on the amount of data being written.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Solutions for are disclosed that include selecting candidate segments in a storage medium; reading blocks of the candidate segments; determining whether any blocks are duplicates; updating a reference count for the duplicate blocks; identifying unique blocks; writing at least a portion of the unique blocks to a log; determining whether the log has accumulated a full segment of data; based at least on determining that the log has accumulated a full segment of data, writing the full segment to the storage medium; updating a segment usage table (SUT) to mark the candidate segments as free; and updating the SUT to mark a segment of the storage medium, used for the full segment, as no longer free. Some examples identifying a window start time and stop time, because older segments have been deduped and younger segments may be volatile. In some examples, the window is adjusted to improve performance.

BRIEF DESCRIPTION OF THE DRAWINGS

The present description will be better understood from the following detailed description read in the light of the accompanying drawings, wherein:

FIGS. 3A, 3B and 3C illustrate further details for various components of FIGS. 1 and 2;

DETAILED DESCRIPTION

Figure 1:
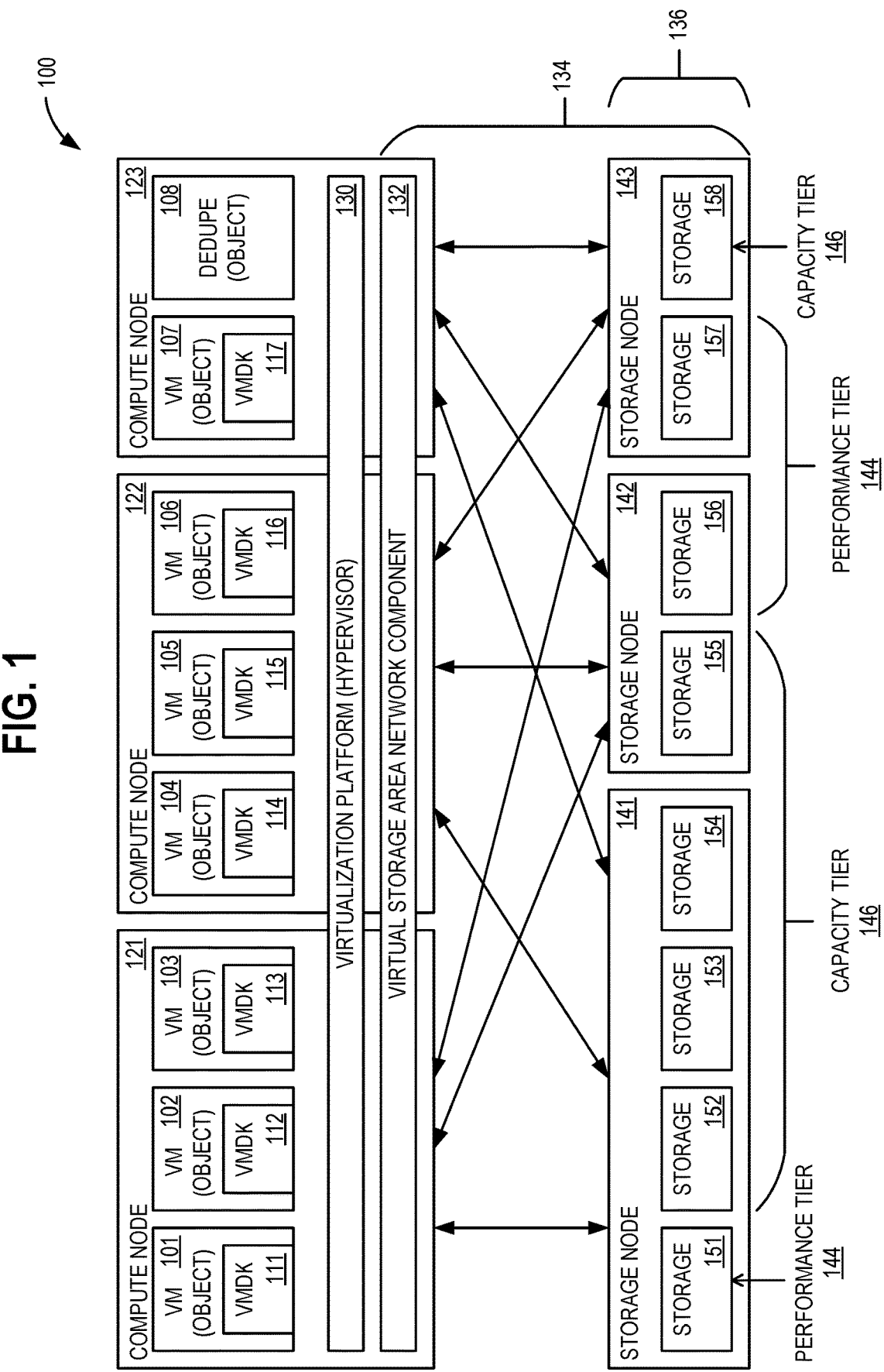
FIG. 1 illustrates an architecture that can advantageously support global deduplication on distributed storage.

Virtualization software that provides software-defined storage (SDS), by pooling storage nodes across a cluster, creates a distributed, shared data store, for example a storage area network (SAN). A log-structured file system (LFS) takes advantage of larger memory sizes that lead to write-heavy input/output (I/O) by writing data and metadata to a circular buffer, called a log. Combining a SAN with an LFS, and making the SAN a single global object, permits the creation of a global LFS, which may be written to concurrently from objects (e.g., virtual machines (VMs)) on multiple compute nodes. The result is a multi-writer LFS, as disclosed herein.

Aspects of the disclosure improve the efficiency of computer storage (e.g., using less storage space) by performing global deduplication on distributed storage, such as a global LFS. Aspects of the disclosure also improve the speed of computer storage by identifying unique blocks (that are not duplicates), writing at least a portion of the unique blocks to a log, and based at least on determining that the log has accumulated a full segment of data, writing the full segment of data to the storage. By writing full segments of data, write amplification may be decreased, resulting in writing speed improvement. Aspects of the disclosure further improve the speed of computer storage by identifying a window having a start time, after data has become less volatile, and a stop time, by when data has already been sufficiently deduplicated, and selecting candidate segments within the window for deduplication. This concentrates deduplication resources on data for which deduplication is likely to be more efficient.

Some aspects of the disclosure additionally leverage existing virtualization software, thereby increasing the efficiency of computing operations, by using segment usage tables (SUTs). SUTs are used to track the space usage of storage segments. In general, storage devices are organized into full stripes spanning multiple nodes and each full stripe may be termed a segment. In some examples, a segment comprises an integer number of stripes. In some examples, a writer writes data to a data log on a performance tier (of the storage nodes) using 3-way mirror (or other number of mirrors that match the same kind of fault tolerance as the capacity tier protected by erasure coding), while waiting for a full segment worth of data being accumulated in the log. A performance tier may be a generally faster storage solution than a capacity tier, which is the larger storage solution used as the final location for the data.

Performing deduplication on the global LFS, across nodes, may result in a greater amount of deduplication (so, less total storage space used for a given amount of unique data) than each individual writer deduplicating only its own storage area. As opposed to inline deduplication as data comes in, offline deduplication waits until a more optimal time, after data volatility has decreased, to perform deduplication. With volatile data, which is generally more recently-written data, some may change or be deleted, rendering deduplication efforts less meaningful. In some examples, the window for performing deduplication is on data that is between one and seven days old. In some examples, the window is adjusted for optimal performance to maximize deduplication effectiveness relative to the amount of overhead needed, for example by moving the start and/or stop times.

During the deduplication process, data (or the metadata describing the data) is read from each segment being processed. The data is hashed and checked against a hash table to identify duplicates. If duplicates exist, the hash table reference count is incremented; only unique data (e.g., blocks of data) is written back to storage. The original location of the data may be marked as free for cleaning by garbage collection (segment cleaning) and is available for reuse. In some examples, rewriting unique blocks back to capacity storage is performed only for full segments. If there is not enough data for writing a full segment, the unique data is written to a log. When the log has accumulated enough for a full segment write, it is written then. In some examples, deduplication is performed as a background process. In some examples, a segment cleaning process not only reads lightly used segments, but also performs off-line deduplication.

Solutions are disclosed that include selecting candidate segments in a storage medium; reading blocks of the candidate segments; determining whether any blocks are duplicates; updating a reference count for the duplicate blocks; identifying unique blocks; writing at least a portion of the unique blocks to a log; determining whether the log has accumulated a full segment of data; based at least on determining that the log has accumulated a full segment of data, writing the full segment to the storage medium; updating a SUT to mark the candidate segments as free; and updating the SUT to mark a segment of the storage medium, used for the full segment, as no longer free. Some examples identifying a window start time and stop time, because older segments have been deduped and younger segments may be volatile. In some examples, the window is adjusted to improve performance.

FIG. 1 illustrates an architecture 100 that can advantageously support global deduplication on distributed storage. Additional details of architecture 100 are provided in FIGS. 2-3C, a timeline associated with architecture 100 is illustrated in FIG. 4, and operations associated with architecture 100 are illustrated in flow charts of FIGS. 5-7. In some examples, various components of architecture 100, for example compute nodes 121, 122, and 123, and storage nodes 141, 142, and 143, are implemented using one or more computing devices 800 of FIG. 8.

Architecture 100 is comprised of a set of compute nodes 121-123 interconnected with each other and a set of storage nodes 141-143, although a different number of compute nodes and storage nodes may be used. Each compute node hosts multiple objects, which may be VMs, segment cleaning (garbage collection) processes or threads, deduplication processes or threads, containers, applications, or any compute entity that can consume storage. For example, compute node 121 hosts objects 101, 102, and 103; compute node 122 hosts objects 104, 105, and 106; and compute node 123 hosts an object 107 and a deduplication process 108. In some examples a single compute node may host 50, 100, or a different number of objects. Each of objects 101-107 uses a VMDK, for example VMDKs 111-117 for each of objects 101-107, respectively. Other implementations using different formats are also possible. Deduplication process 108 is also an object and a writer. A virtualization platform 130, which includes hypervisor functionality, manages objects 101-107 and deduplication process 108.

Storage nodes 141-143 each include multiple physical storage components, which may include flash, solid state drives (SSDs), non-volatile memory express (NVMe), persistent memory (PMEM), and quad-level cell (QLC) storage solutions. For example, storage node 141 has storage 151, 152, 152, and 154; storage node 142 has storage 155 and 156; and storage node 143 has storage 157 and 158. In some examples, a single storage node may include a different number of physical storage components. In the described examples, storage nodes 141-143 are treated as a SAN with a single global object, enabling any of objects 101-107 and deduplication process 108 to write to and read from any of storage 151-158 using a virtual SAN component 132. Virtual SAN component 132 executes in compute nodes 121-123. Virtual SAN component 132 and storage 151-158 together form a global LFS 134. Because multiple ones of objects 101-108 (deduplication process 108 may also be referred to as an object) are able to write to global LFS 134 simultaneously, global LFS 134 is a multi-writer LFS. Simultaneous writes are possible, without collisions (conflicts), because each object (which is also a writer) uses its own local SUT that was assigned its own set of free spaces.

In some examples, storage 151-158 is just a bunch of disks (JBOD), and if implemented using flash drives, may be referred to as just a bunch of flash (JBOF). Thin-provisioning may be used, and in some examples, storage nodes 141-143 do not require significantly more processing power than is needed for handling I/O traffic. This arrangement may be less expensive than all of storage nodes 141-143 having the same processing capability as compute node 121. Using the disclosure, compute nodes 121-123 are able to operate with a wide range of storage options, including those with minimal processing capability.

In general, storage components may be categorized as performance tier or capacity tier. Performance tier storage is generally faster, at least for writing, than capacity tier storage. In some examples, performance tier storage has a latency approximately 10% that of capacity tier storage and/or throughput of approximately ten times (10×) that of capacity tier storage. Thus, when speed is important, and the amount of data is relatively small, write operations will be directed to performance tier storage. However, when the amount of data to be written is larger, capacity tier storage will be used. As illustrated, storage 151, 156, and 157 are collectively designated as a performance tier 144 (one per each of storage nodes 141, 142, and 143, for performance) and storage 152-155 and 158 are collectively designated as a capacity tier 146. In general, metadata will be written to performance tier 144 and bulk object data will be written to capacity tier 146. In some scenarios, as explained below, data intended for capacity tier 146 will be temporarily stored on performance tier 144, until a sufficient amount has accumulated that writing operations to capacity tier 146 will be more efficient (e.g., by reducing write amplification). Alternatively, there may not be a clear distinction between performance tier 144 and capacity tier 146, so at least some set or subset of storage 151-158 is designated collectively as a storage medium 136.

Figure 2:
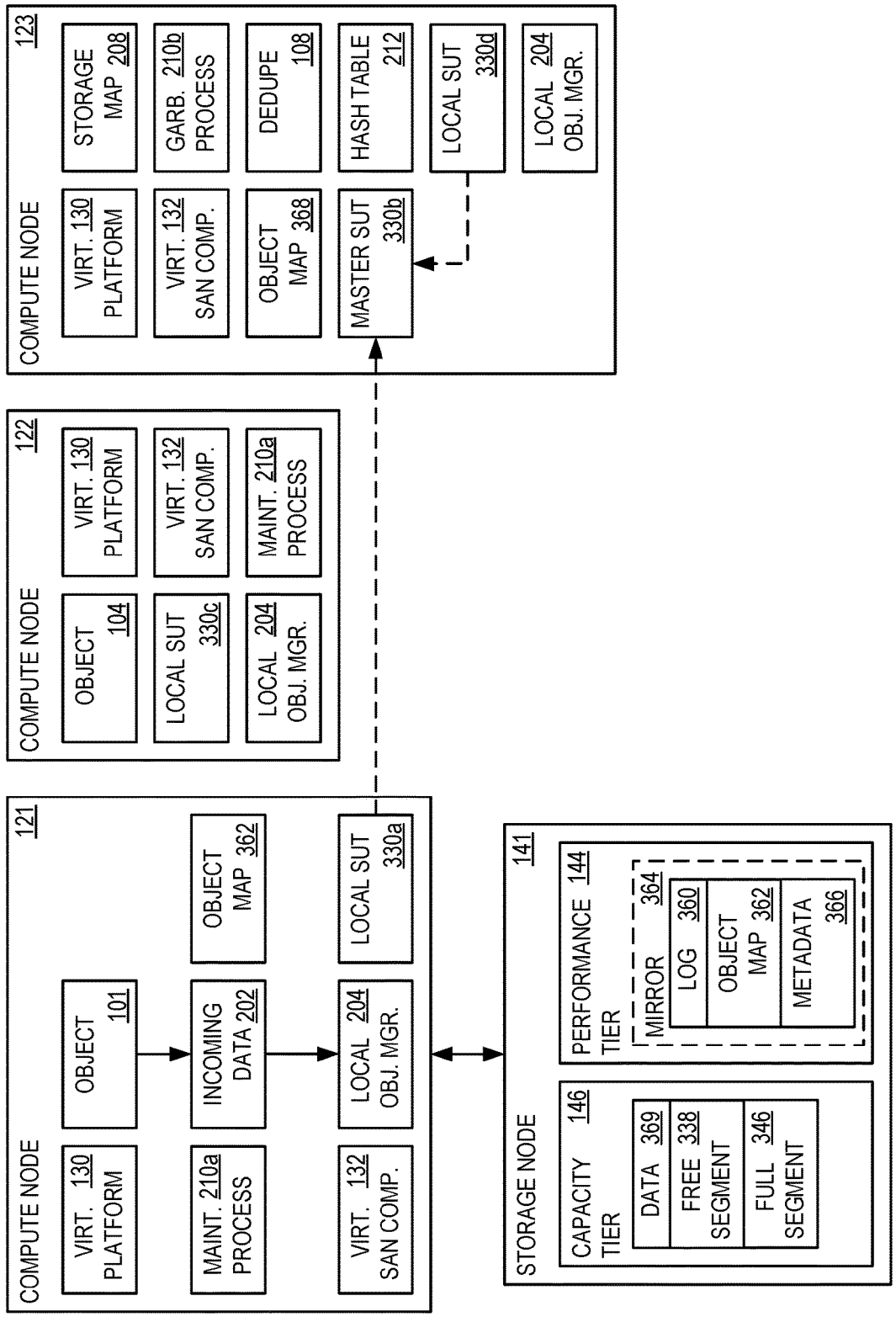
FIG. 2 illustrates additional details for the architecture of FIG. 1.

FIG. 2 illustrates additional details for architecture 100. Compute nodes 121-123 each include a manifestation of virtualization platform 130 and virtual SAN component 132. Virtualization platform 130 manages the generating, operations, and clean-up of objects, such as objects 101-107 and deduplication process 108. Virtual SAN component 132 permits objects 101-107 and deduplication process 108 to write incoming data 202 (incoming from object 101) to storage node 141, which houses performance tier 144 and at least a portion of capacity tier 146, by virtualizing the physical storage components of storage node 141 (and other storage nodes 142 and 143). Storage nodes 141-143 are described in further detail in relation to FIG. 3A.

Turning briefly to FIG. 3A, a set of disks D1, D2, D3, D4, D5, and D6 are shown in a data striping arrangement 300. Data striping divides or segments logically sequential data, such as blocks of files, so that consecutive portions are stored on different physical storage devices. By spreading portions across multiple devices which can be accessed concurrently, total data throughput is increased. This also balances I/O load across an array of disks. Striping is used across disk drives in redundant array of independent disks (RAID) storage, for example RAID-5/6. RAID configurations may employ the techniques of striping, mirroring, and/or parity to create large reliable data stores from multiple general-purpose storage devices. RAID-5 consists of block-level striping with distributed parity. Upon failure of a single storage device, subsequent reads can be calculated using the distributed parity as an error correction attempt. RAID 6 extends RAID 5 by adding a second parity block. Arrangement 300 may thus be viewed as a RAID-6 arrangement with four data disks (D1-D4) and two parity disks (D5 and D6). This is a 4+2 configuration. Other configurations are possible, such as 17+3, 20+2, 12+4, 15+7, and 100+2.

A stripe is a set of blocks, as shown in the rectangle in FIG. 3A, for example as stripe 302. Four columns are data blocks, based on the number of data disks, D1-D4, and two of the columns are parities, indicated as P1 and Q1 in the first row, based on the number of parity disks, D5 and D6. Thus, in some examples, the stripe size is defined by the available storage size. In some examples, blocks are each 4 kilobytes (KB). In some examples, QLC requires a 128 KB write. With 128 KB and six disks, the stripe size is 768 KB (128 KB×6=768 KB), of which 512 KB is data, and 256 KB is parity. With 32 disks, the stripe size is 4 megabytes (MB). A segment 304 is shown as including 4 blocks from each of D1-D4, numbered 0 through 15, plus parity blocks designated with P1-P4 and Q1-Q4. A segment is the unit of segment cleaning, and in some examples, is aligned on stripe boundaries. In some examples, a segment is a stripe. In some examples, a segment is an integer number of stripes. Additional stripes 306a and 306b are shown below segment 304.

When a block is being written, write amplification occurs. In general, there are three types of updates: small partial stripe writes, large partial stripe writes, and full stripe writes. With small partial stripe writes, old content of the to-be-written blocks and parity blocks are read to calculate the new parity blocks, and new blocks and parity blocks are written. With large partial stripe writes, the untouched blocks in the stripe of the content are read to calculate the new parity blocks, and new blocks and new parity blocks are written. With full stripe writes, new parity blocks are calculated based on new blocks, and the full stripe is written. When writing only full stripes or segments, the read-modify-write penalty can be avoided, reducing write amplification and increasing efficiency and speed.

Returning now to FIG. 2, in some examples, a local object manager 204 treats the virtualization layer of virtual SAN component 132 as a physical layer (e.g., by adding its own logical-to-physical map, checksum, caching, and free space management, onto it and exposing its logical address space). In some examples, a local object manager 204 on each of compute nodes 121-123 manages the updating of local SUTs 330a, 330c, and 330d. Either local object manager 204 or virtual SAN component 132 (or another component) manages merging updates to local SUTs 330a, 330c, and 330d into master SUT 330b. Compute node 123 is the owner of master SUT 330b, that is, compute node 123 is the master SUT owner. Both compute nodes 122 and 123 may also have their own local SUTs, and changes to those local SUTs will also be merged into master SUT 330b. Because each object (e.g., VM, deduplication process, deduplication process, segment cleaning process, or another writer) goes through its own version of local SUT 330a, which is allocated its own free space according to master SUT 330b, there will be no conflicts. Local SUTs 330a, 330c, and 330d, and master SUT 330b are described in further detail in relation to FIG. 3B.

Turning briefly to FIG. 3B, an exemplary SUT 330 is illustrated. SUT 330 may represent any of local SUT 330a, local SUT 330c, local SUT 330d, and master SUT 330b. SUT 330 is used to track the space usage of each segment in a storage arrangement, such as arrangement 300. In some examples, SUT 330 is initialized with values pulled from a storage node (e.g., storage node 141) during bootstrap for access by virtualization platform 130 (e.g., into the hypervisor functionality). In FIG. 3B, segments are illustrated as rows of matrix 332, and blocks with live data (live blocks) are indicated with shading. Non-shaded blocks are either empty or have contained data but are marked to indicate that the data has been deleted. Each segment has an index, indicated in segment index column 334. The number of blocks available for writing is indicated in free count column 336. The number of blocks available for writing decrements for the segment being written to, with each write operation. For example, a free segment, such as free segment 338, has a free count equal to the total number of blocks in the segment (in the illustrated example, 16), whereas a full segment, such as full segment 346 has a free count of zero. In some examples, a live block count is used, in which a value of zero indicates a free segment rather than a full segment. In some examples, SUT 330 forms a doubly-linked list. A doubly linked list is a linked data structure having a set of sequentially linked records.

SUT 330 is used to keep track of space usage and age in each segment. This is needed for segment cleaning, and also to identify free segments, such as free segments 338, 338a, and 338b, to allocate to individual writers (e.g., objects 101-107, deduplication process 108, and any segment cleaning processes). If a free count indicates that no blocks in a segment contain live data, that block can be written to without any need to move any blocks. Any prior-written data in that segment has either already been moved or marked as deleted and thus may be over-written without penalty. This avoids read operations that would be needed if data in that segment needed to be moved elsewhere for preservation. As indicated, segments 342a, 342b, and 342c are mostly empty, and are thus lightly-used segments. A segment cleaning process may target these live blocks for moving to a free segment. Segment 344 is indicated as a heavily-used segment, and thus may be passed over for segment cleaning.

Returning now to FIG. 2, although local SUT 330a is illustrated as being stored within compute node 121 although, in some examples, local SUT 330a may be held elsewhere. In some examples, master SUT 330b is managed by a single node in the cluster (e.g., compute node 123, the master SUT owner), whose job is handing out free segments to all writers. Allocation of free segments to writers is indicated in master SUT 330b, with each writer being allocated different free segments. For example, when deduplication process 108 needs more segments, master SUT 330b finds new segments (e.g., free segment 338) and assigns it to deduplication process 108. Different writers receive different, non-overlapping assignments of free segments. Because each writer knows where to write, and writes to different free segments, multiple writers may operate in parallel.

Object map 362 is used for tracking the location of data for object 101, for example if incoming data 202 is stored in log 360 in performance tier 144. Similarly, object map 368 is used for tracking the location of data for deduplication process 108. In some examples, object maps 362 and 368 are stored on performance tier 144 or elsewhere. Other metadata is also stored in performance tier 144, and data in performance tier 144 may be mirrored with mirror 364. When data is moved from log 360 in performance tier 144 to data 369 in capacity tier 146, for example as part of a write of a full segment, references to that data may be removed from the appropriate object map (e.g., object map 362 or 368). In some examples, object maps 362 and 368 comprise B-trees, log-structured merge-trees (LSM trees) or some other indexing structures such as write-optimized trees, or $B^\varepsilon$-trees. A B-tree is a self-balancing tree data structure that maintains sorted data and allows searches, sequential access, insertions, and deletions in logarithmic time. An LSM tree or $B^\varepsilon$-tree is a data structure with performance characteristics that make it attractive for providing indexed access to files with high insert volume, such as transactional log data. Each writer has its own object map. A logical-to-physical storage map 208 uses an object ID as a major key, thereby preventing overlap of the object maps of different writers.

Deduplication process 108 uses its own local object manager 204, its own object map 368, and its own local SUT 330d for recording free segments, used segments, allocated segments, and the locations of data within log 360. A hash table 212 is used by deduplication process 108 and may be stored locally (e.g., on compute node 123, where deduplication process 108 is executing), on performance tier 144, and/or live within memory where deduplication process 108 is executing. A local maintenance process 210a on compute nodes 121 and 122 (and also possibly on compute node 123) may be a local deduplication process and/or a local segment cleaning process. A global maintenance process 210b on compute node 123 may be a global segment cleaning process.

Figure 3C:
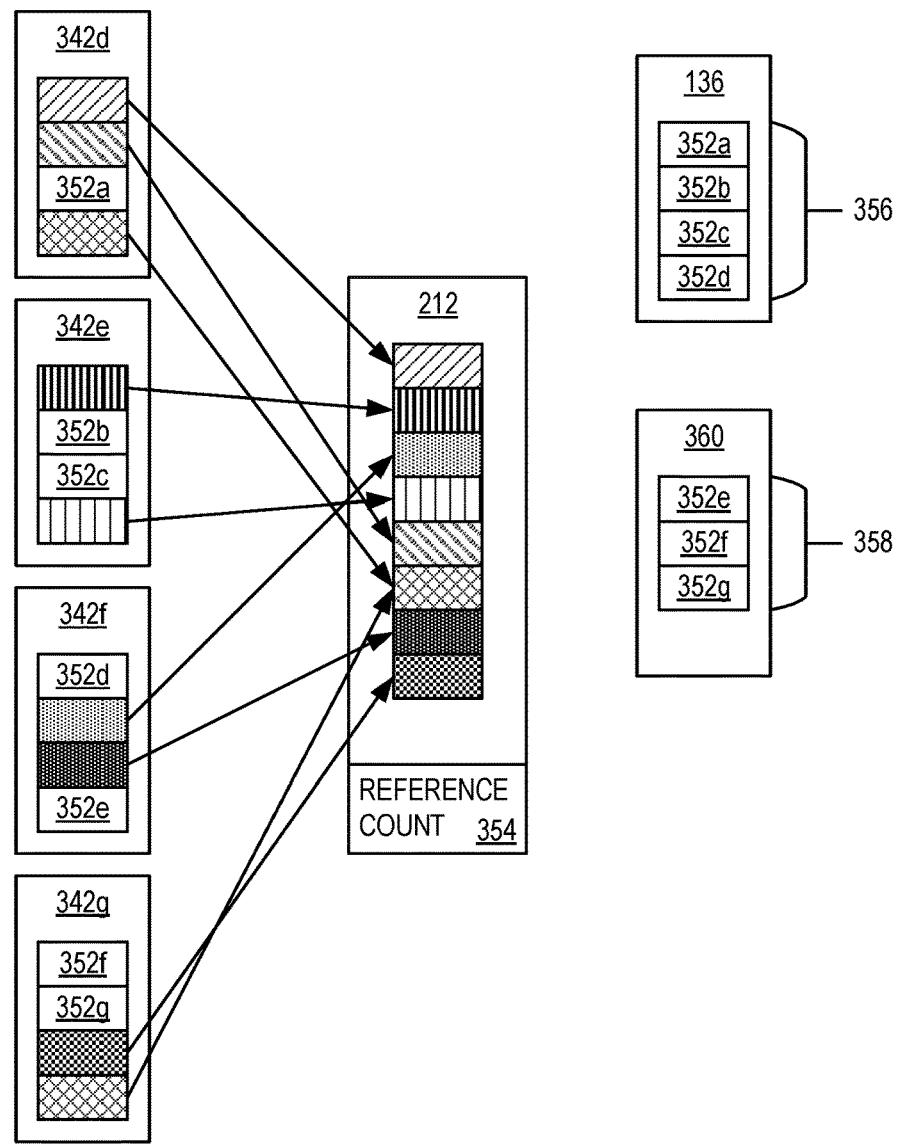
Figure 4:
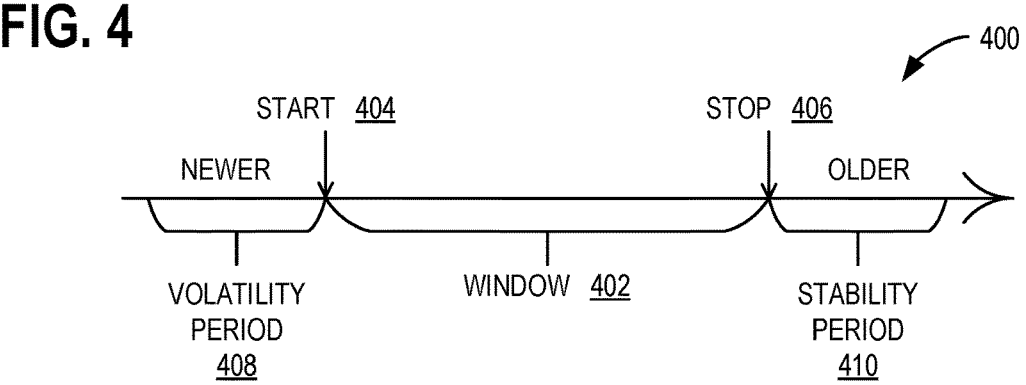
FIG. 4 illustrates an exemplary timeline associated with the architecture of FIG. 1.

FIG. 3C illustrates a set of candidate segments 342d-342g, on which deduplication will be performed, hash table 212, which includes reference count table 354, a full segment of data 356, and a remainder portion 358. As indicated, candidate segment 342d has three duplicate blocks and one unique block 352a. Candidate segment 342e has two duplicate blocks and two unique blocks 352b and 352c. Candidate segment 342f also has two duplicate blocks and two unique blocks 352d and 352e. Candidate segment 342g also has two duplicate blocks and two unique blocks 352f and 352g. The reference counts in reference count table 354 that correspond to the duplicate blocks are incremented according to the number of duplicates.

Unique blocks 352a-352g are separated into a full segment's worth of data, and written to storage medium 136 as full segment of data 356. As illustrated, this is unique blocks 352a-352d, although this number of blocks is only for explanation. The rest, which cannot fit within full segment of data 356, specifically unique blocks 352e-352g, are written to log 360 as remainder portion 358.

FIG. 4 illustrates an exemplary timeline 400 associated with the architecture of FIG. 1. A window 402 has a start time 404 and a stop time 406. Candidate segments 342d-342g of FIG. 3C had write times within window 402. Timeline 400 indicates more recent (newer) write times to the left, and older write times to the right.

A volatility period 408 exists prior to start time 404, in which data may likely be too volatile for deduplication to be worth the overhead. For example, data written during volatility period 408 may be more likely to be changed or deleted than data written during window 402. A stability period 410 follows stop time 406; data in stability period 410 may have already been subject to sufficient deduplication that further deduplication may not be worth the overhead. In some examples, start time 404 is one day and stop time 406 is seven days. In some examples, start time 404 and stop time 406 may be set to initial values and then adjusted to find an optimum window for deduplication effectiveness or efficiency. Deduplication may be scored using the number of blocks eliminated from writing, relative to the processing burden (overhead) imposed by deduplication process 108. In some examples, if a block in window 402 is modified, it is moved into the volatility period 408. In some examples, a simple trial approach, perhaps using a sensitivity analysis, is used for making adjustments to window 402. In some examples, a machine learning (ML) component (e.g., ML component 818 of FIG. 8) makes adjustments to window 402.

Figure 5A:
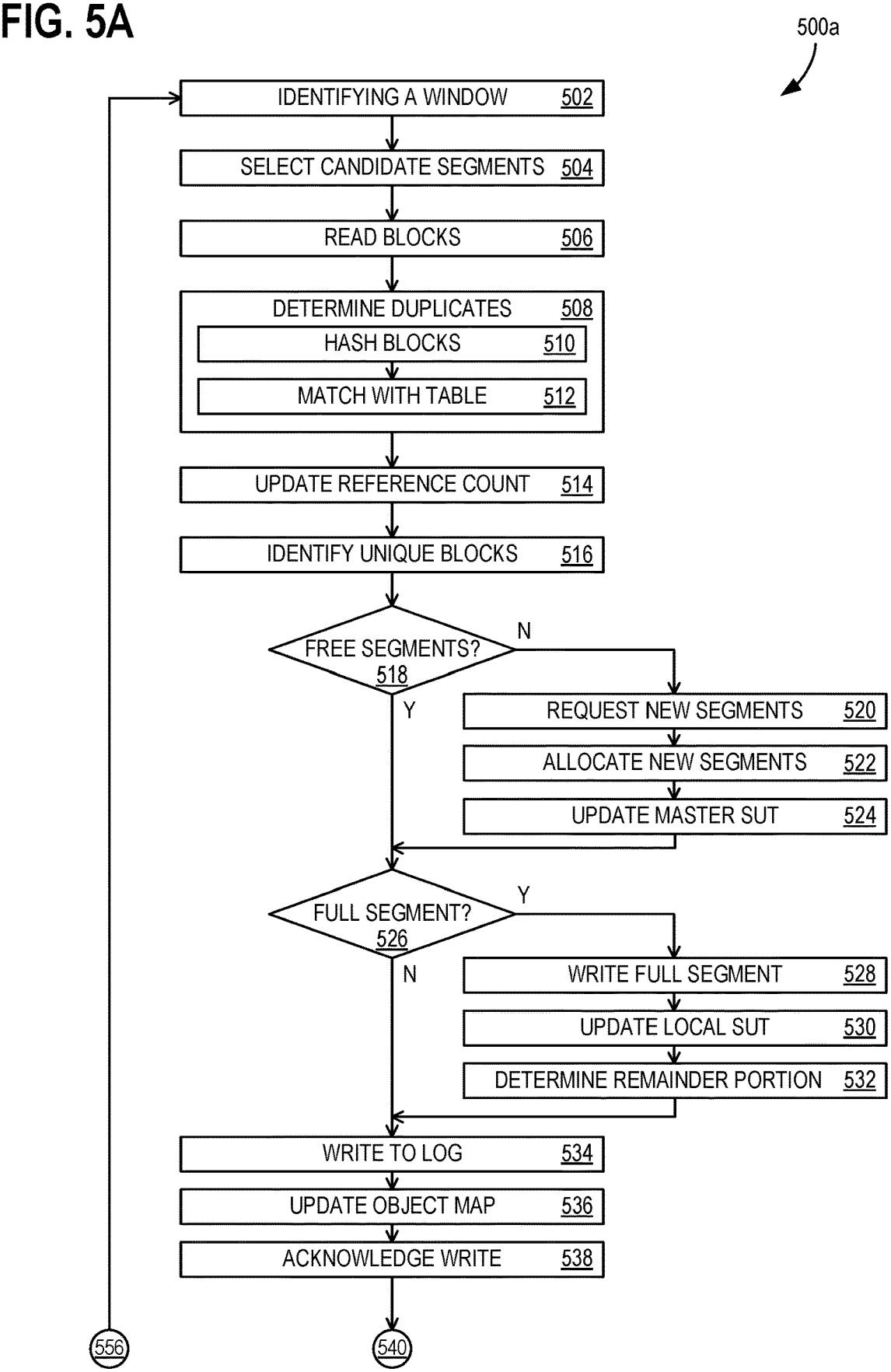
FIGS. 5A and 5B illustrate flow charts of exemplary operations associated with the architecture of FIG. 1.
Figure 5B:
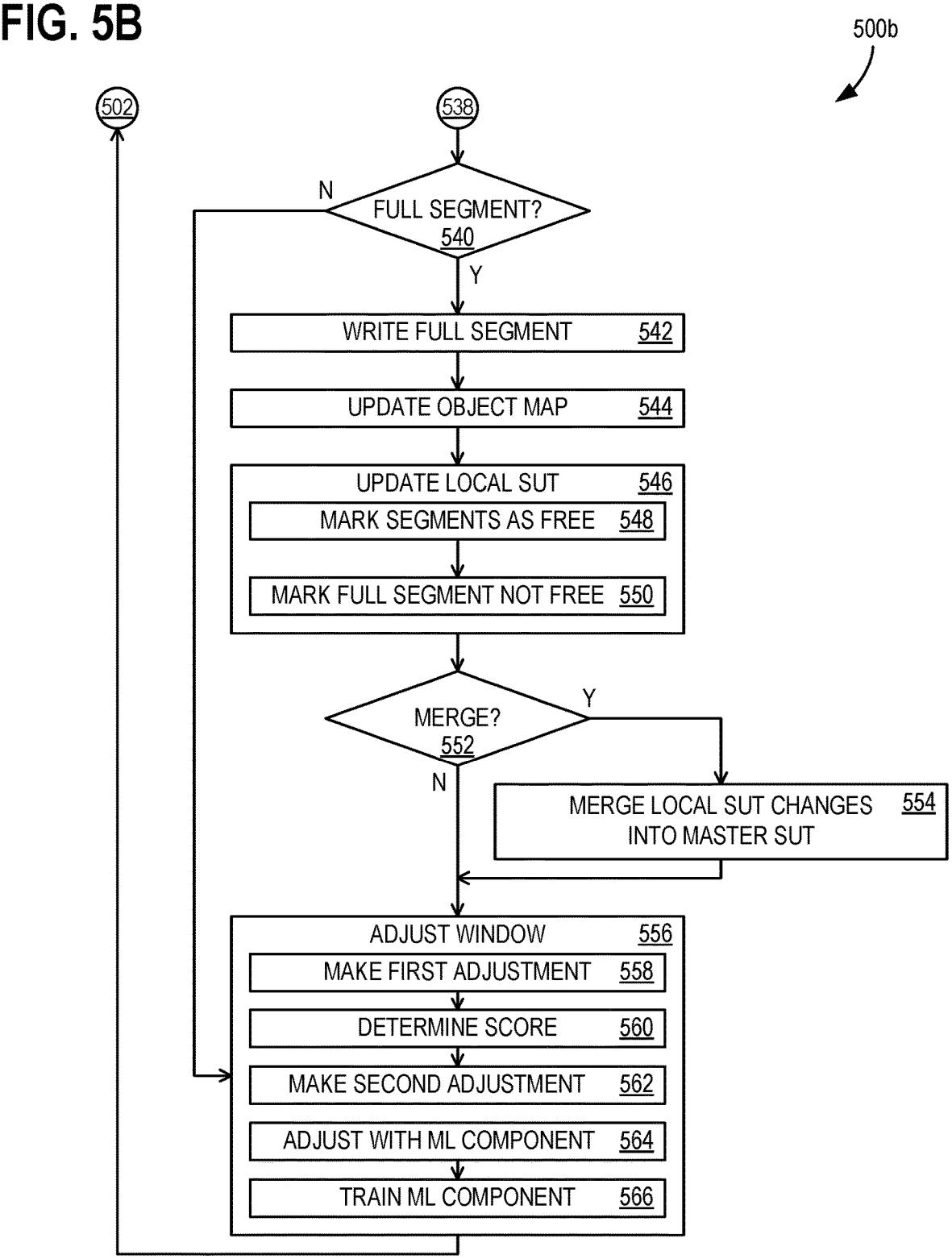
Figure 5C:
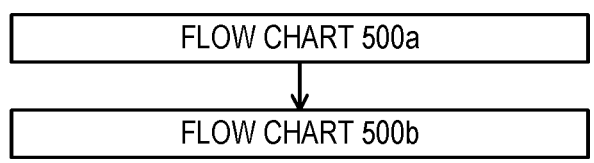
FIG. 5C shows the relationship between FIGS. 5A and 5B.

FIGS. 5A and 5B illustrate flow charts 500a and 500b should be viewed together and, combined, form a flow chart 500, as shown in FIG. 5C. In some examples, flow chart 500 may operate on a schedule, such as once daily, hourly, or another schedule, or upon some trigger condition, such as storage medium 136 reaching a threshold level of being full. In some examples, the operations of flow chart 500 are performed as a background process. Operation 502 includes identifying a window having a start time and a stop time, for example window 402 with start time 404 and stop time 406. Operation 504 includes selecting, by a deduplication process, candidate segments in a storage medium. For example, candidate segments 342d-342g in storage medium 136 are selected because their ages fall within window 402. The candidate segments have an age starting within the window and, in some examples, the storage medium comprises a capacity tier.

Operation 506 includes reading blocks of the candidate segments, and operation 508 includes determining whether any blocks of the candidate segments are duplicates. Operation 508 includes operations 510 and 512. Operation 510 includes hashing the blocks of the candidate segments to generate block hash values, and operation 512 includes determining whether any block hash values match values within a hash table (e.g., hash table 212). Operation 514 includes updating a reference count for the duplicate blocks of the candidate segments, and operation 516 includes identifying unique blocks of the candidate segments (e.g., unique blocks 352a-352g). A decision operation 518 includes determining whether sufficient free segments are available for writing to the storage medium, such as determining whether deduplication process 108 has been assigned free segment 338, and deduplication process 108 will not require any more space than free segment 338 to write out unique blocks 352a-352g. If no free segments had been assigned, and at least one free segment is needed, then there is an insufficient number of free segments available. If one free segment had been assigned, and at least two free segments are needed, then there is an insufficient number of free segments available. In some examples, a reserve amount of free segments is maintained, and if the space needed will drop the reserve below the reserve amount, then sufficient free segments are not available.

If additional free segments are needed, operation 520 includes based at least on determining that insufficient free segments are available for writing to the storage medium, requesting allocation of new segments. In some examples, requesting allocation of new segments comprises requesting allocation of new segments from the owner of the master SUT. Operation 522 includes allocating, by an owner of a master SUT, new segments for the object, and operation 524 includes indicating the allocation of the new segments in the master SUT. For example, the reservation of free segments 338 and 338a for deduplication process 108 is indicated in master SUT 330b, for example by marking them as live. In this manner, allocation of new segments of the first storage is indicated in a master SUT.

A decision operation 526 includes prior to writing at least a portion of the unique blocks to a log, determining whether the unique blocks comprise at least a full segment of data. The unique blocks comprise the full segment portion and a remainder portion, for example, unique blocks 352a-352g comprise full segment portion (full segment of data 356) and remainder portion 358. Operation 528 includes, based at least on determining that the unique blocks comprise at least a full segment of data, writing a full segment portion of the unique blocks to the storage medium. Operation 530 includes updating a local SUT to indicate the writing of the full segment portion of the unique blocks to the storage medium (e.g., writing full segment of data 356 to storage medium 136). Operation 532 includes determining a remainder portion of the unique blocks (e.g., remainder portion 358). Operation 534 includes writing at least a portion of the unique blocks to a log (e.g., log 360). If a full segment of data had been written in operation 528, writing at least a portion of the unique blocks to the log comprises writing the remainder portion of the unique blocks to the log. Otherwise, if there had not been enough unique blocks for a full segment, all of the unique blocks may be written to the log. In some examples, writing at least a portion of the unique blocks to a log comprises writing to a performance tier. Some examples include mirroring the log, and some example mirror the log with a three-way mirror.

Operation 536 includes, based at least on writing the unique blocks to the log, updating an object map to indicate the writing of the unique blocks. In some examples, a logical-to-physical storage map uses an object ID as a major key, thereby preventing overlap of object maps. Operation 538 includes acknowledging the writing to the deduplication process (e.g., deduplication process 108). A decision operation 540 includes determining whether the log has accumulated a full segment of data. If so, operation 542 includes, based at least on determining that the log has accumulated a full segment of data, writing the full segment of data to the storage medium. Operation 544 includes, based at least on writing the writing the full segment of data to the storage medium, updating the object map to indicate the writing of the full segment of data to the storage medium. For example, because deduplication process 108 uses object map 368, object map 368 is updated to remove references to unique blocks 352e-352g being in log 360.

Operation 546 includes updating the local SUT. Because deduplication process 108 uses local SUT 330d, local SUT 330d is updated. Operation 546 includes at least two operations: 548 and 550. Operation 548 includes updating a SUT to mark the candidate segments as free. In some examples, updating the SUT to mark the candidate segments as free comprises updating a local SUT, for example, local SUT 330d. Operation 550 includes updating the SUT to mark a segment of the storage medium, used for the full segment of data, as no longer free. In some examples, updating the SUT to mark a segment of the storage medium comprises updating the local SUT.

A decision operation 552 includes determining whether a merge trigger condition has occurred. For example, a merge trigger may be a threshold amount of changes to local SUT 330d, which prompts a SUT merge into master SUT 330b, or may be a timer event indicating a maximum wait time. Merges may wait until a trigger condition, and are not needed immediately, because free segments had already been deconflicted. That is, each writer writes to only its own allocated segments. In the event of a merge trigger condition, operation 554 includes merging local SUT updates into a master SUT.

The window, for example window 402, is adjusted in operation 556. Operation 556 is shown as including multiple operations, some of which are optional. Operation 558 includes making a first window adjustment by changing at least one of the start time and the stop time, and operation 560 includes determining an effect of the first window adjustment on a deduplication score. The deduplication score may be calculated using the number of blocks deduplicated relative to the processing burden of deduplication process 108. Operation 562 includes, based at least on the deduplication score effect, making a second window adjustment. For example, using a sensitivity analysis, the degree of score change may be used to calculate the second window adjustment that may provide an improved deduplication score. In some examples, however, operation 564 includes adjusting the time window using an ML component, and operation 566 includes training the ML component. Thus, either ML or traditional procedures maybe used to optimize deduplication process 108 via selecting an optimum window 402.

Figure 6:
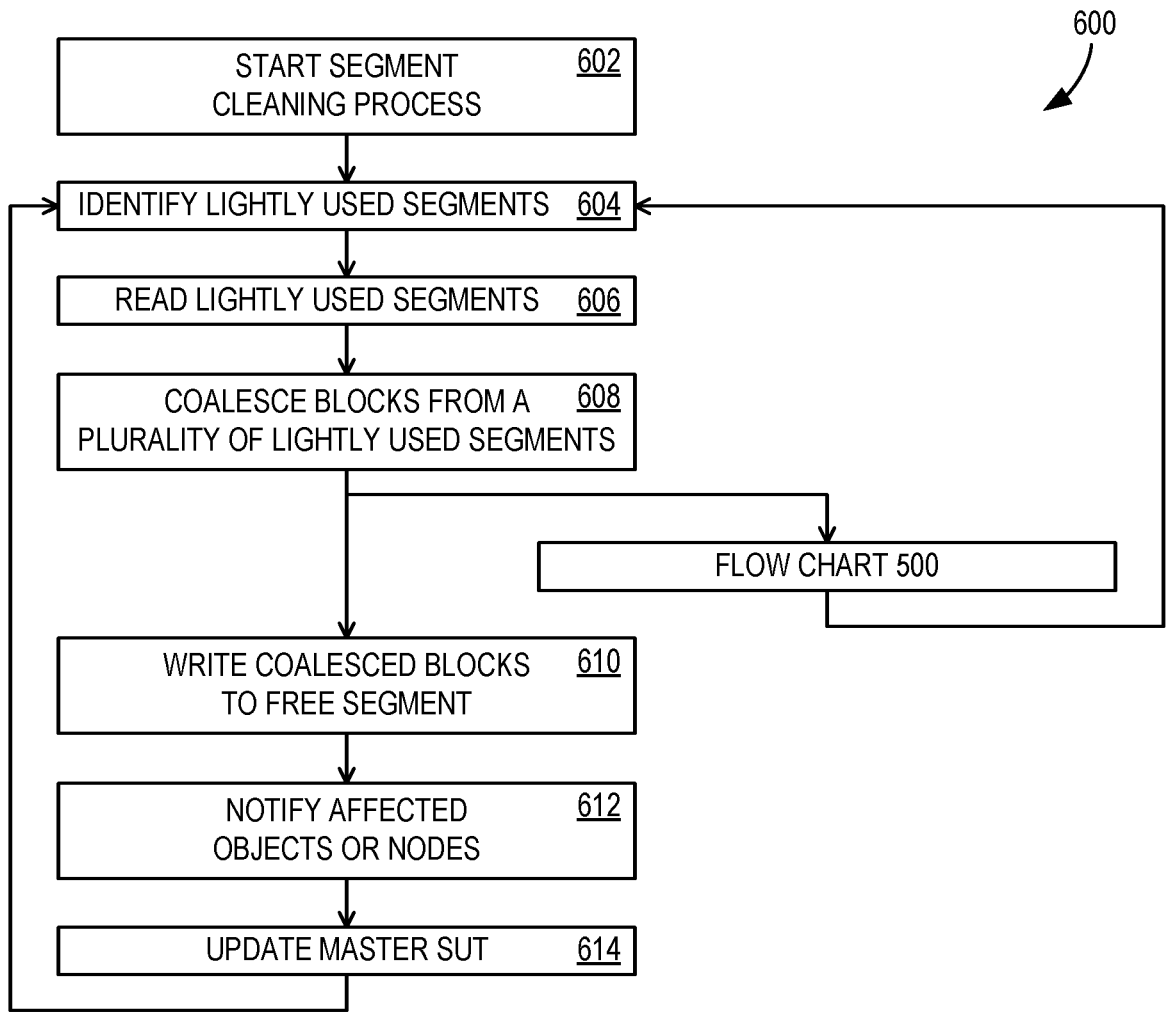
FIG. 6 illustrates another flow chart of exemplary operations associated with the architecture of FIG. 1.

FIG. 6 illustrates a flow chart 600 of a segment cleaning process that may be used in conjunction with flow chart 500. A segment cleaning process is used to create free space, for example entire segments, for new writes. In some examples, the operations of flow charts 500 and 600 are performed by one or more computing devices 800 of FIG. 8. Although flow charts 500 and 600 are illustrated for simplicity as a linear workflow, one or more of the operations represented by flow charts 500 and 600 may be asynchronous.

Operation 602 starts a segment cleaning process. Operation 604 identifies lightly used segments (e.g., segments 342a, 342b, and 342c), and these are read in operation 606. Operation 608 coalesces live blocks from a plurality of lightly used segments. In some examples, the deduplication process of flow chart 500 is a part of a global segment cleaning processes, and flow chart 500 follows operation 608. Any segments marked as free, based on performing a segment cleaning process in conjunction with flow chart 500 are marked as free in local SUT 330d.

In some scenarios, it is optional for the segment cleaning process to also perform deduplication. In such scenarios, operation 610 writes the coalesced blocks back to storage, but using a fewer number of segments than the number of lightly used segments from which the blocks had been coalesced in operation 608. Operation 612 includes notifying at least affected nodes of block movements resulting from the segment cleaning processes. This enables local SUTs to be updated. Operation 614 includes updating the master SUT to indicate that the formerly lightly-used segments are now free segments, which can be assigned for further writing operations. The segment cleaning process may then loop back to operation 604 or terminate.

Figure 7:
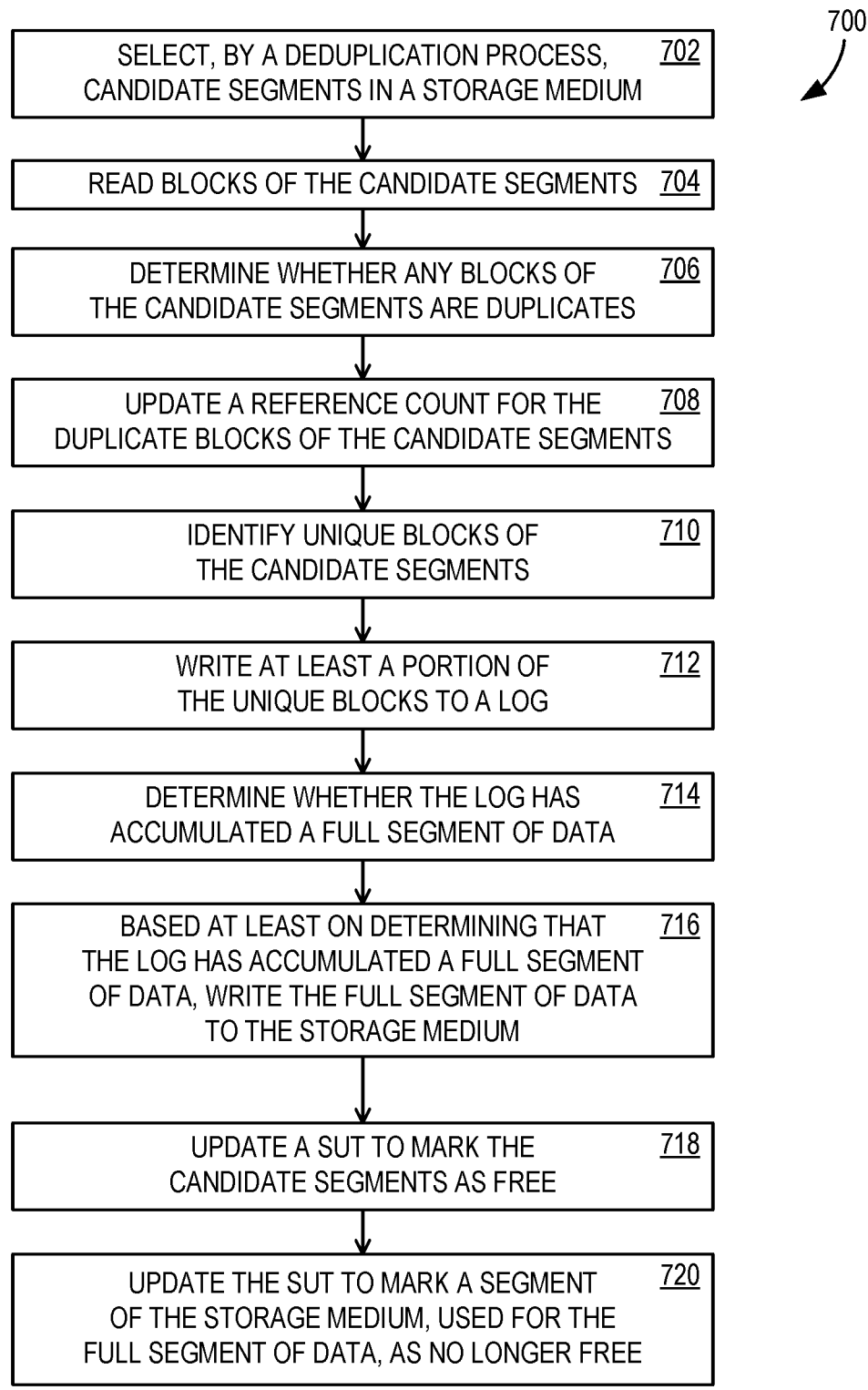
FIG. 7 illustrates another flow chart of exemplary operations associated with the architecture of FIG. 1.

FIG. 7 illustrates a flow chart 700 showing a method of global deduplication on distributed storage. In some examples, the operations of flow chart 700 are performed by one or more computing devices 800 of FIG. 8. Operation 702 includes selecting, by a deduplication process, candidate segments in a storage medium. Operation 704 includes reading blocks of the candidate segments. Operation 706 includes determining whether any blocks of the candidate segments are duplicates. Operation 708 includes updating a reference count for the duplicate blocks of the candidate segments. Operation 710 includes identifying unique blocks of the candidate segments. Operation 712 includes writing at least a portion of the unique blocks to a log. Operation 714 includes determining whether the log has accumulated a full segment of data. Operation 716 includes based at least on determining that the log has accumulated a full segment of data, writing the full segment of data to the storage medium. Operation 718 includes updating a segment usage table (SUT) to mark the candidate segments as free. Operation 720 includes updating the SUT to mark a segment of the storage medium, used for the full segment of data, as no longer free.

Figure 8:
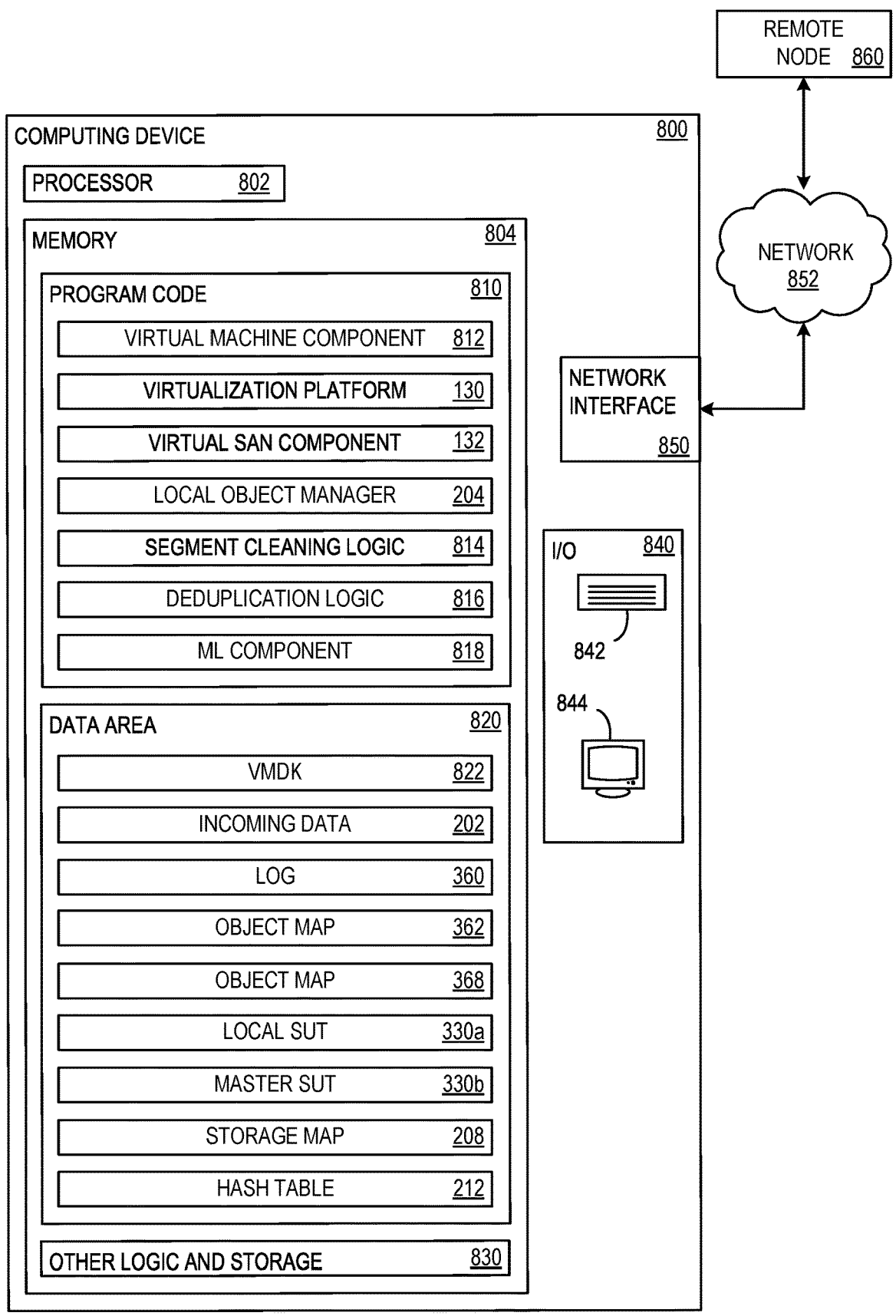
FIG. 8 illustrates a block diagram of a computing device that may be used as a component of the architecture of FIG. 1, according to an example embodiment.

FIG. 8 illustrates a block diagram of computing device 800 that may be used within architecture 100 of FIG. 1. Computing device 800 has at least a processor 802 and a memory 804 (or memory area) that holds program code 810, data area 820, and other logic and storage 830. Memory 804 is any device allowing information, such as computer executable instructions and/or other data, to be stored and retrieved. For example, memory 804 may include one or more random access memory (RAM) modules, flash memory modules, hard disks, solid-state disks, NVMe devices, Persistent Memory devices, and/or optical disks. Program code 810 comprises computer executable instructions and computer executable components including any of virtual machine component 812, virtualization platform 130, virtual SAN component 132, local object manager 204, segment cleaning logic 814, and deduplication logic 816. Virtual machine component 812 generates and manages objects, for example objects 101-107 and deduplication process 108. Segment cleaning logic 814 may represent various manifestations of maintenance processes 210a and 210b. Deduplication logic 816 is the logic for deduplication process 108, and ML component 818 adjusts window 402, as described in relation to flow chart 500 of FIG. 5.

Data area 820 holds any of VMDK 822, incoming data 202, log 360, object maps 362 and 368, local SUT 330a, master SUT 330b, storage map 208, and hash table 212. VMDK 822 represents any of VMDKs 111-117. Memory 804 also includes other logic and storage 830 that performs or facilitates other functions disclosed herein or otherwise required of computing device 800. A keyboard 842 and a computer monitor 844 are illustrated as exemplary portions of I/O component 840, which may also or instead include a touchscreen, mouse, trackpad, and/or other I/O devices. A network interface 850 permits communication over a network 852 with a remote node 860, which may represent another implementation of computing device 800, a cloud service. For example, remote node 860 may represent any of compute nodes 121-123 and storage nodes 141-143.

Computing device 800 generally represents any device executing instructions (e.g., as application programs, operating system functionality, or both) to implement the operations and functionality described herein. Computing device 800 may include any portable or non-portable device including a mobile telephone, laptop, tablet, computing pad, netbook, gaming device, portable medium player, desktop personal computer, kiosk, embedded device, and/or tabletop device. Additionally, computing device 800 may represent a group of processing units or other computing devices, such as in a cloud computing system or service. Processor 802 may include any quantity of processing units and may be programmed to execute any components of program code 810 comprising computer executable instructions for implementing aspects of the disclosure. In some embodiments, processor 802 is programmed to execute instructions such as those illustrated in the figures.

Additional Examples

An example computer system for global deduplication on distributed storage comprises: a processor; and a non-transitory computer readable medium having stored thereon program code for transferring data to another computer system, the program code causing the processor to: select, by a deduplication process, candidate segments in a storage medium; read blocks of the candidate segments; determine whether any blocks of the candidate segments are duplicates; update a reference count for the duplicate blocks of the candidate segments; identify unique blocks of the candidate segments; write at least a portion of the unique blocks to a log; determine whether the log has accumulated a full segment of data; based at least on determining that the log has accumulated a full segment of data, write the full segment of data to the storage medium; update a SUT to mark the candidate segments as free; and update the SUT to mark a segment of the storage medium, used for the full segment of data, as no longer free.

An exemplary method of global deduplication on distributed storage comprises: selecting, by a deduplication process, candidate segments in a storage medium; reading blocks of the candidate segments; determining whether any blocks of the candidate segments are duplicates; updating a reference count for the duplicate blocks of the candidate segments; identifying unique blocks of the candidate segments; writing at least a portion of the unique blocks to a log; determining whether the log has accumulated a full segment of data; based at least on determining that the log has accumulated a full segment of data, writing the full segment of data to the storage medium; updating a SUT to mark the candidate segments as free; and updating the SUT to mark a segment of the storage medium, used for the full segment of data, as no longer free.

One or more exemplary non-transitory computer storage mediums have computer-executable instructions that, upon execution by a processor, cause the processor to at least perform operations that comprise: selecting, by a deduplication process, candidate segments in a storage medium; reading blocks of the candidate segments; determining whether any blocks of the candidate segments are duplicates; updating a reference count for the duplicate blocks of the candidate segments; identifying unique blocks of the candidate segments; writing at least a portion of the unique blocks to a log; determining whether the log has accumulated a full segment of data; based at least on determining that the log has accumulated a full segment of data, writing the full segment of data to the storage medium; updating a SUT to mark the candidate segments as free; and updating the SUT to mark a segment of the storage medium, used for the full segment of data, as no longer free.

Alternatively, or in addition to the other examples described herein, examples include any combination of the following:
- determining whether any blocks of the candidate segments have duplicates comprises: hashing the blocks of the candidate segments to generate block hash values; and determining whether any block hash values match values within a hash table;
- identifying a window having a start time and a stop time, wherein the candidate segments have an age starting within the window;
- making a first window adjustment by changing at least one of the start time and the stop time;
- determining an effect of the first window adjustment on a deduplication score;
- based at least on the deduplication score effect, making a second window adjustment;
- determining whether sufficient free segments are available for writing to the storage medium;
- based at least on determining that insufficient free segments are available for writing to the storage medium, requesting allocation of new segments.
- prior to writing at least a portion of the unique blocks to a log, determining whether the unique blocks comprise at least a full segment of data;
- based at least on determining that the unique blocks comprise at least a full segment of data, writing a full segment portion of the unique blocks to the storage medium;
- the unique blocks comprise the full segment portion and a remainder portion;
- writing at least a portion of the unique blocks to the log comprises writing the remainder portion of the unique blocks to the log;
- the deduplication process is a part of a global segment cleaning processes;
- the storage medium comprises a capacity tier;
- allocating, by an owner of a master SUT, new segments for the object;
- indicating the allocation of the new segments in the master SUT;
- determining a remainder portion of the unique blocks;
- writing at least a portion of the unique blocks to a log comprises writing to a performance tier;
- mirroring the log;
- mirroring the log with a three-way mirror;
- based at least on writing the unique blocks to the log, updating an object map to indicate the writing of the unique blocks;
- a logical-to-physical storage map uses an object ID as a major key, thereby preventing overlap of object maps;
- acknowledging the writing to the deduplication process;
- updating the SUT to mark a segment of the storage medium comprises updating a local SUT;
- based at least on at least writing the writing the full segment of data to the storage medium, updating the object map to indicate the writing of the full segment of data to the storage medium;
- determining whether a merge trigger condition has occurred;
- merging local SUT updates into a master SUT; and
- based at least on performing a segment cleaning process, updating the local SUT to mark freed segments as free;

Exemplary Operating Environment

The operations described herein may be performed by a computer or computing device. The computing devices comprise processors and computer readable media. By way of example and not limitation, computer readable media comprise computer storage media and communication media. Computer storage media include volatile and non-volatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, NVMe devices, persistent memory devices, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special purpose computing device when programmed to execute the instructions described herein. The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The term "computing device" and the like are used herein to refer to any device with processing capability such that it can execute instructions. Those skilled in the art will realize that such processing capabilities are incorporated into many different devices and therefore the terms "computer", "server", and "computing device" each may include PCs, servers, laptop computers, mobile telephones (including smart phones), tablet computers, and many other devices. Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of global deduplication on distributed storage, the method comprising:
    selecting, by a deduplication process, candidate segments in a storage medium;
    reading blocks of the candidate segments;
    determining whether any blocks of the candidate segments are duplicates;
    updating a reference count for the duplicate blocks of the candidate segments;
    identifying unique blocks of the candidate segments;
    writing at least a portion of the unique blocks to a log;
    determining whether the log has accumulated a full segment of data;
    based at least on determining that the log has accumulated a full segment of data, writing the full segment of data to the storage medium;
    updating a segment usage table (SUT) to mark the candidate segments as free; and
    updating the SUT to mark a segment of the storage medium, used for the full segment of data, as no longer free.

2. The method of claim 1, wherein determining whether any blocks of the candidate segments have duplicates comprises:
    hashing the blocks of the candidate segments to generate block hash values; and
    determining whether any block hash values match values within a hash table.

3. The method of claim 1, further comprising:
    identifying a window having a start time and a stop time, wherein the candidate segments have an age starting within the window.

4. The method of claim 3, further comprising:
    making a first window adjustment by changing at least one of the start time and the stop time;
    determining an effect of the first window adjustment on a deduplication score; and
    based at least on the deduplication score effect, making a second window adjustment.

5. The method of claim 1, further comprising:
    determining whether sufficient free segments are available for writing to the storage medium; and
    based at least on determining that insufficient free segments are available for writing to the storage medium, requesting allocation of new segments.

6. The method of claim 1, further comprising:
    prior to writing at least a portion of the unique blocks to a log, determining whether the unique blocks comprise at least a full segment of data;
    based at least on determining that the unique blocks comprise at least a full segment of data, writing a full segment portion of the unique blocks to the storage medium, wherein the unique blocks comprise the full segment portion and a remainder portion, and wherein writing at least a portion of the unique blocks to the log comprises writing the remainder portion of the unique blocks to the log; and
    updating the SUT to mark a segment of the storage medium, used for the full segment portion, as no longer free.

7. The method of claim 1, wherein the deduplication process is a part of a global segment cleaning processes.

8. A computer system for global deduplication on distributed storage, the computer system comprising:
    a processor; and
    a non-transitory computer readable medium having stored thereon program code for transferring data to another computer system, the program code causing the processor to:
        select, by a deduplication process, candidate segments in a storage medium;
        read blocks of the candidate segments;
        determine whether any blocks of the candidate segments are duplicates;
        update a reference count for the duplicate blocks of the candidate segments;
        identify unique blocks of the candidate segments;
        write at least a portion of the unique blocks to a log;
        determine whether the log has accumulated a full segment of data;

based at least on determining that the log has accumulated a full segment of data, write the full segment of data to the storage medium;

update a segment usage table (SUT) to mark the candidate segments as free; and update the SUT to mark a segment of the storage medium, used for the full segment of data, as no longer free.

9. The computer system of claim 8, wherein determining whether any blocks of the candidate segments have duplicates comprises:

hashing the blocks of the candidate segments to generate block hash values; and determine whether any block hash values match values within a hash table.

10. The computer system of claim 8, wherein the program code is further operative to:

identify a window having a start time and a stop time, wherein the candidate segments have an age starting within the window.

11. The computer system of claim 10, wherein the program code is further operative to:

make a first window adjustment by changing at least one of the start time and the stop time;

determine an effect of the first window adjustment on a deduplication score; and based at least on the deduplication score effect, make a second window adjustment.

12. The computer system of claim 8, wherein the program code is further operative to:

determine whether sufficient free segments are available for writing to the storage medium; and based at least on determining that insufficient free segments are available for writing to the storage medium, request allocation of new segments.

13. The computer system of claim 8, wherein the program code is further operative to:

prior to writing at least a portion of the unique blocks to a log, determine whether the unique blocks comprise at least a full segment of data;

based at least on determining that the unique blocks comprise at least a full segment of data, write a full segment portion of the unique blocks to the storage medium, wherein the unique blocks comprise the full segment portion and a remainder portion, and wherein writing at least a portion of the unique blocks to the log comprises writing the remainder portion of the unique blocks to the log; and update the SUT to mark a segment of the storage medium, used for the full segment portion, as no longer free.

14. The computer system of claim 8, wherein the deduplication process is a part of a global segment cleaning processes.

15. A non-transitory computer readable storage medium having stored thereon program code executable by a first computer system at a first site, the program code embodying a method comprising:

selecting, by a deduplication process, candidate segments in a storage medium;

reading blocks of the candidate segments;

determining whether any blocks of the candidate segments are duplicates;

updating a reference count for the duplicate blocks of the candidate segments;

identifying unique blocks of the candidate segments;

writing at least a portion of the unique blocks to a log;

determining whether the log has accumulated a full segment of data;

based at least on determining that the log has accumulated a full segment of data, writing the full segment of data to the storage medium;

updating a segment usage table (SUT) to mark the candidate segments as free; and updating the SUT to mark a segment of the storage medium, used for the full segment of data, as no longer free.

16. The non-transitory computer storage medium of claim 15, wherein determining whether any blocks of the candidate segments have duplicates comprises:

hashing the blocks of the candidate segments to generate block hash values; and determining whether any block hash values match values within a hash table.

17. The non-transitory computer storage medium of claim 15, wherein the program code further comprises:

identifying a window having a start time and a stop time, wherein the candidate segments have an age starting within the window.

18. The non-transitory computer storage medium of claim 17, wherein the program code further comprises:

making a first window adjustment by changing at least one of the start time and the stop time;

determining an effect of the first window adjustment on a deduplication score; and based at least on the deduplication score effect, making a second window adjustment.

19. The non-transitory computer storage medium of claim 15, wherein the program code further comprises:

determining whether sufficient free segments are available for writing to the storage medium; and based at least on determining that insufficient free segments are available for writing to the storage medium, requesting allocation of new segments.

20. The non-transitory computer storage medium of claim 15, wherein the program code further comprises:

prior to writing at least a portion of the unique blocks to a log, determining whether the unique blocks comprise at least a full segment of data;

based at least on determining that the unique blocks comprise at least a full segment of data, writing a full segment portion of the unique blocks to the storage medium, wherein the unique blocks comprise the full segment portion and a remainder portion, and wherein writing at least a portion of the unique blocks to the log comprises writing the remainder portion of the unique blocks to the log; and updating the SUT to mark a segment of the storage medium, used for the full segment portion, as no longer free.

* * * * *